US007973955B2

(12) United States Patent
Emerson (10) Patent No.: US 7,973,955 B2
(45) Date of Patent: Jul. 5, 2011

(54) SPECIFICATION AND MANAGEMENT OF CONSOLIDATED TICKET PACKAGES IN WORKFLOWS

(75) Inventor: Daniel F. Emerson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/555,566

(22) Filed: Nov. 1, 2006

(65) Prior Publication Data
US 2008/0189631 A1  Aug. 7, 2008

(51) Int. Cl.
*G06F 3/12* (2006.01)
*G06F 15/00* (2006.01)
*G06F 9/46* (2006.01)
*G06F 17/30* (2006.01)
*G06K 15/02* (2006.01)

(52) U.S. Cl. ........ 358/1.15; 358/1.9; 358/1.13; 358/2.1; 358/1.2; 718/104; 707/806

(58) Field of Classification Search .................. 358/1.13, 358/1.15, 1.2, 1.9, 2.1; 718/100, 102, 104; 707/601, 803, 806, 807
See application file for complete search history.

(56) References Cited

U.S. PATENT DOCUMENTS

| 6,975,820 | B2 | 12/2005 | Wong |
| 6,980,993 | B2 | 12/2005 | Horvitz et al. |
| 7,092,987 | B2 | 8/2006 | Brittingham et al. |
| 7,096,143 | B2 | 8/2006 | Ternasky et al. |
| 2002/0194245 | A1 | 12/2002 | Simpson et al. |
| 2005/0030558 | A1* | 2/2005 | Wiechers et al. ............. 358/1.3 |
| 2005/0210227 | A1 | 9/2005 | Emerson et al. |
| 2005/0246102 | A1 | 11/2005 | Foehr et al. |
| 2006/0106775 | A1 | 5/2006 | Kuhn et al. |
| 2006/0114493 | A1 | 6/2006 | Slightam et al. |
| 2006/0120349 | A1 | 6/2006 | Taylor et al. |

OTHER PUBLICATIONS

"Integrated Print System", retrieved at <<http://www.zoran.com/IMG/pdf/IPSXPS_Product_Brief.pdf>>, Zoran Corporation, 2006, pp. 02.
Klyne, et al., "Composite Capability/Preference Profiles (CC/PP): Structure and Vocabularies 1.0", retrieved on Aug. 30, 2006, at <<http://www.w3.org/TR/CCPP-struct-vocab/>>, W3C Recommendation Jan. 15, 2004, W3C, 2004, pp. 1-70.
"The XPSDrv Filter Pipeline", retrieved at <<http://download.microsoft.com/download/9/c/5/9c5b2167-8017-4bae-9fde-d599bac8184a/XPSDrv_FilterPipe.doc>>, Microsoft Corporation, 2005, Nov. 3, 2005, pp. 1-36.

* cited by examiner

*Primary Examiner* — Thomas J Lett
(74) *Attorney, Agent, or Firm* — Lee & Hayes, PLLC (57) ABSTRACT

Systems, methods, and/or techniques ("tools") for specifying and managing consolidated ticket packages in workflows are provided. In some aspects, the tools may request and receive indications of capabilities of devices that may participate in a workflow, and may generate ticket packages based on the device capabilities, with the ticket packages being consolidated across the workflow. In other aspects, the tools may provide the device capabilities upon request, and may receive job requests that include the ticket packages. In still other aspects, the tools may present a user interface that includes representations of one or more workflows, may receive from a user a selection of one of the workflows, and may present information from a ticket package related to the selected workflow.

20 Claims, 7 Drawing Sheets

SPECIFICATION AND MANAGEMENT OF CONSOLIDATED TICKET PACKAGES IN WORKFLOWS

BACKGROUND

As new types of devices become available in the market, enterprises or other users of these devices are continually integrating these new devices into workflows. Typically, different devices offer different capabilities, and these devices may expose their capabilities using different mechanisms. Thus, those who wish to use these devices in workflows may face the prospect of discovering and using a variety of different techniques to extract the capabilities of different devices. Further, where a given device offers multiple functions, this single device may expose the capabilities of these different functions using different mechanisms. For example, the device may provide one application program interface (API) for querying for scan-related functions, and another API for querying for print-related functions.

Additionally, once the capabilities of the devices have been extracted, the integration of these capabilities into workflows remains an issue. More specifically, applications may use conventional techniques to specify settings for multiple devices in a given workflow. Under these conventional techniques, the applications may face the burden of interacting with each device on a piecemeal basis to specify the settings for whatever functions that the device is performing in the workflow.

SUMMARY

Systems, methods, and/or techniques ("tools") for specifying and managing consolidated ticket packages in workflows are provided. In some aspects, the tools may request and receive indications of capabilities of devices that may participate in a workflow, and may generate ticket packages based on the device capabilities, with the ticket packages being consolidated across the workflow. In other aspects, the tools may provide the device capabilities upon request, and may receive job requests that include the ticket packages. In still other aspects, the tools may present a user interface that includes representations of one or more workflows, may receive from a user a selection of one of the workflows, and may present information from a ticket package related to the selected workflow.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to specifying and managing consolidated ticket packages in workflows are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for specification and management of consolidated ticket packages in workflows. This discussion also describes other techniques and/or processes that the tools may perform.

In some aspects, the tools enable the representation of user configurable device capabilities for multifunction devices in a single capabilities package (e.g., an XML document). In other aspects, the tools enable users and applications to specify device settings for jobs, with the device settings being based on the device capabilities reported in a capabilities package. Throughout this disclosure, the terms "device capabilities" and "capabilities package" are used interchangeably.

Figure 1:
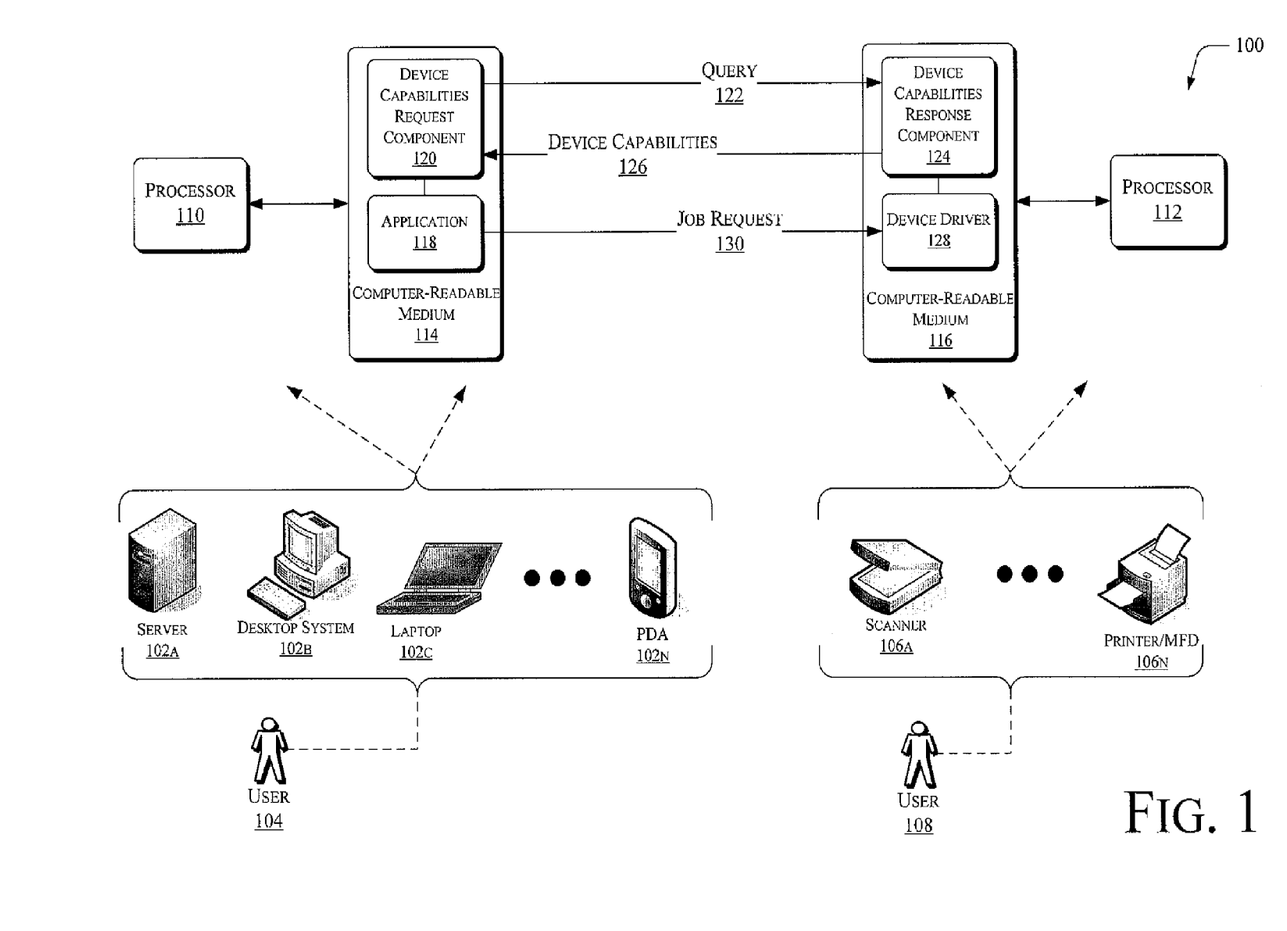
FIG. 1 is a combined block and flow diagram of operating environments for specifying and managing consolidated ticket packages in workflows.

FIG. 1 illustrates operating environments 100 for specifying and managing consolidated ticket packages in workflows. The operating environments 100 may include one or more devices, such servers 102a, desktop computing systems 102b, laptop or notebook computing systems 102c, personal digital assistants (PDAs) 102n, or the like. It is understood that implementations of the operating environment may include any number of different types of such devices (collectively, devices 102). Additionally, FIG. 1 shows these examples of such devices only for convenience of illustration, but not to limit possible implementations.

One or more users 104 may be associated with the devices 102. As described in further detail below, these users 104 may initiate jobs or workflows, or may participate in existing workflows. To perform such functions, these users may interact with one or more of the devices 102. For ease of description, but not limitation, the users 104 and/or the devices 102 may be viewed as clients that may request services.

The operating environments 100 may also include one or more devices that may offer services or resources to the users 104 and/or the devices 102. For example, but not limitation, FIG. 1 illustrates a scanner device 106a and a multifunction device (MFD) 106n (collectively, devices 106). The MFD may provide scanning, faxing, printing, or other capabilities in one device.

One or more users 108 may be associated with the devices 106. As described in further detail below, these users 108 may administer the devices 106, or may configure the devices 106 to perform particular functions. For ease of description, but not limitation, the users 108 may be viewed as administrators, and the devices 106 may be viewed as servers that offer services to the devices 102 and/or the users 104.

In general, the devices 102 and 106 may be computer-based systems that include one or more processor(s), denoted respectively at 110 and 112. These processors may also be categorized or characterized as having a given type or architecture, but may or may not have the same type or architecture.

The devices 102 and 106 may also include one or more instances of computer-readable storage media, denoted respectively at 114 and 116. The computer-readable media 114 and 116 may contain instructions that, when executed by the processors 110 and 112, perform any of the tools or related functions as described herein. The processors 110 and 112 may be configured to access and/or execute the instructions embedded or encoded onto the computer-readable media.

Turning in more detail to the computer-readable media 114, it may include one or more applications 118. These applications 118 may include, for example, word processing applications, database applications, image processing or editing applications, browsers, or the like. In general, the users 104 may interact with the applications using resources provided by the devices 102.

The computer-readable media 114 may also include one or more instances of a device capabilities request component 120. It is noted that the request component is shown apart from the application 118 only for ease of discussion and reference, but not to limit implementations of the description herein. For example, in some implementations, the request component may be part of the application.

Assume, for example, that a particular user 104 wishes to use one of the devices 106 to perform one or more given jobs or tasks. Examples of such tasks may include scanning, faxing, printing, archiving, routing, or the like. In some instances, the user may setup and control multiple sub-tasks to be performed as part of a given job using, for example, the ticket package mechanism described below in FIG. 2. To initiate this job, the user may issue appropriate commands to the application 118. These commands may include, for example, scanning commands, printing commands, or the like. More specifically, the commands may relate to obtaining the capabilities of the devices 106. In the illustrated implementation, the application 118 may refer these commands from the users 104 to the request component 120. In other implementations in which the request component is part of the application, the request component may take the form of an application program interface (API) that the application may call.

Upon receiving an indication that the users 104 have issued the commands, the request component 120 may generate a query 122 to the device 106. For example, the query 122 may be a request that the device, 106 provide a listing of its capabilities. More specifically, the computer readable media 116 of the device 106 may include a device capabilities response component 124 that receives the query 122, and responds thereto. For example, if the query 122 is an inquiry for device capabilities, the response component 124 may generate and provide a response, denoted generally as device capabilities 126. In possible implementations, the device capabilities 126 may be specified in a single XML document as illustrated in the example below:

```
<schema1:DeviceCapabilities>
    <schema1:PrintCapabilities>
    ...
    </schema1:PrintCapabilities>
    <schema1:ScanCapabilities>
    ...
    </schemaN:FunctionNCapabilities>
</schema1:DeviceCapabilities>
```

In this example, the document defines a <DeviceCapabilities> root XML element, along with multiple <FunctionCapabilities> XML child elements. The <DeviceCapabilities> represents an entire device 106, while each child element represents a specific function of the device. Each <FunctionCapabilities> child element may be defined in a different schema for processing as defined by the namespace of the child element. In this example, the document defines print capabilities and scan capabilities under a first schema ("schema1"), and defines an arbitrary example function under a second schema ("schemaN").

The processing of this document may be exposed through one or more APIs. Using these APIs, the request component 120 may provide a single mechanism for the application 118 to query the "capabilities package" for devices 106 (e.g., the MFD 106n). Some implementations may also include separate APIs to independently query each function contained in a "capabilities package". For example, an application could query only the <PrintCapabilities> for a multi-function device that supports print and scan functions.

The response component 124 may interact with a device driver 128 for the device 106 to provide the device capabilities 126. Different devices 106 may be associated with corresponding device drivers 128.

Returning to the device 102, having received the device capabilities 126, the device 102 and/or the user 104 may consider the capabilities of the device. More specifically, the application 118 may formulate a request 130 to access these capabilities in one or more jobs or workflows. The request 130 may include, for example, a print job, a scan job, or the like. In addition, the request 130 may include a request to initiate a workflow that includes, for example, a print job, scan job, or the like.

Figure 2:
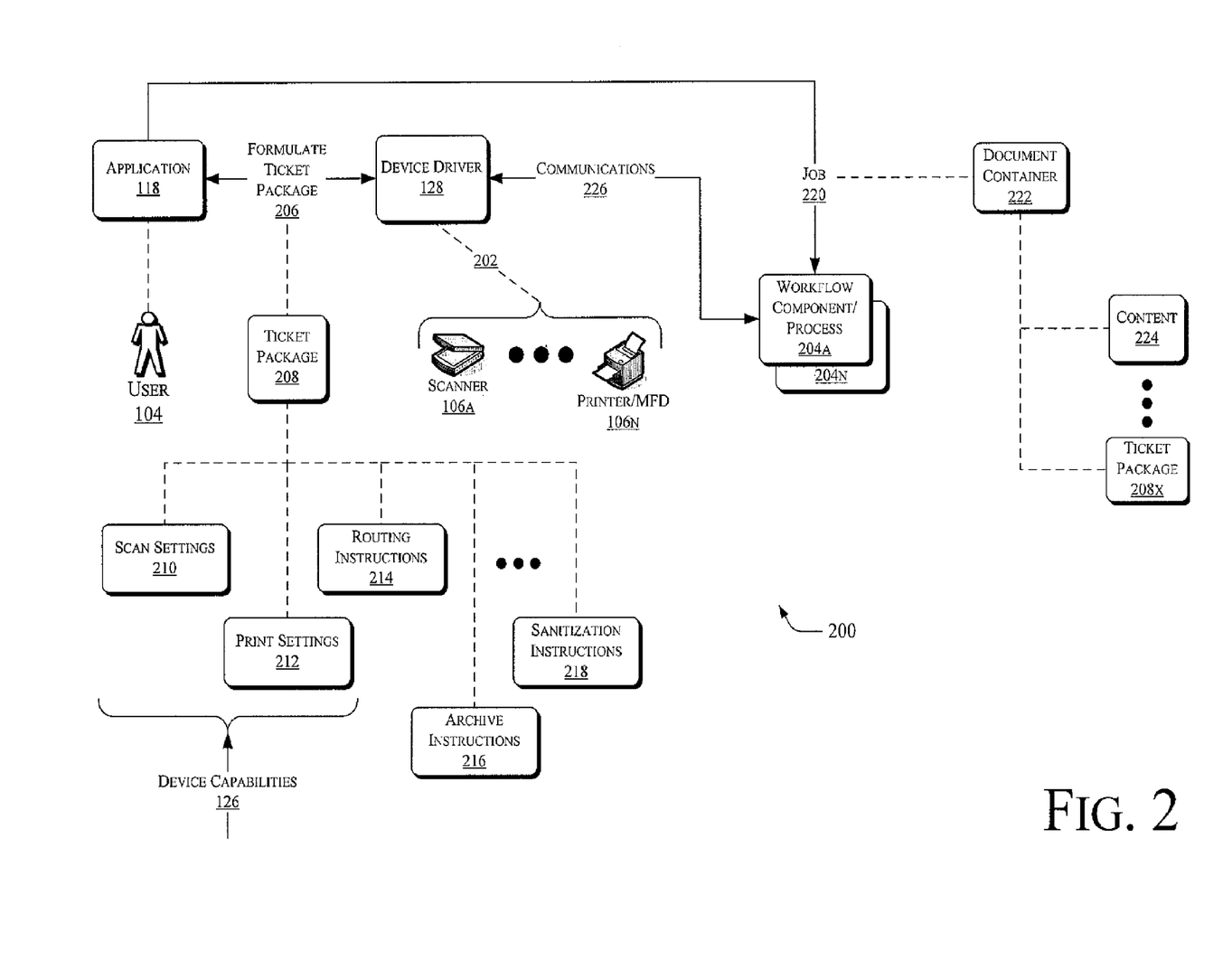
FIG. 2 is a combined block and flow diagram related to ticket packages and document containers described as part of the tools for specifying and managing consolidated ticket packages in workflows.

Having described the operating environments 100, the discussion now turns to a description of ticket packages and document containers, now presented with FIG. 2.

FIG. 2 illustrates combined blocks and flows 200 related to ticket packages and document containers described as part of the tools for specifying and managing consolidated ticket packages in workflows. For convenience of description, but not to limit possible implementations, some items described previously are carried forward into FIG. 2 and denoted by similar reference signs.

As described in FIG. 1, the query 122 may provide a mechanism by which the application 118 may obtain device capabilities 126 related to given devices (e.g., 106A and 106N). These devices may be associated with respective device drivers 128, as represented by the dashed line 202. One or more of these devices may participate in a given workflow. The workflows may include one or more individual workflow components or workflow processes 204. FIG. 2 shows two examples of such components or processes, at 204A and 204N (collectively 204). These components or processes may include interactions with none or some of the devices 106. Additionally, these components or processes 204 may be arranged in sequence or in parallel, as appropriate to implement any number of possible workflows. Examples of these components or processes may include: input processes, such as scanning or other forms of data entry; output processes, such as printing, archiving, sanitization operations, or the like; or intermediate processes, such as compliance reviews, audits, edits or modifications, routing instructions, or the like.

In any event, if the application 118 wishes to send a job to one of these devices as part of a workflow, the application may query (e.g., 122 in FIG. 1) the device driver that corresponds to the device to obtain the capabilities (e.g., 126 in FIG. 1) of that device. FIG. 2 represents these communications generally at 206, and based on these communications, the application may formulate a data structure that includes a ticket package element 208. The ticket package element may enable the user to setup and control multiple tasks (e.g., scan, then print, then archive) with a single ticket package.

For convenience of description, but not limitation, an example of an XML implementation of the ticket package element 208 is produced here. The ticket package element allows multiple device function settings to be included in a single XML document, as illustrated below:

```
<schema1:DeviceTicket>
    <schema1:ScanTicket>
    ...
    </schema1:ScanTicket>
    <schema1:PrintTicket>
    ...
    </schema1:PrintTicket>
    <schema2:RoutingTicket>
    ...
    </schema2:RoutingTicket>
    <schema3:ArchiveTicket>
    ...
    </schema3:ArchiveTicket>
    <schemaN:FunctionNTicket>
    ...
    </schemaN:FunctionNTicket>
    <schemaZ:SanitizationTicket>
    ...
    </schemaZ:SanitizationTicket>
</schema1:DeviceTicket>
```

In this example, a <DeviceTicket> root XML element is defined under which multiple <FunctionTicket> XML child elements may be defined. The root <DeviceTicket> represents an entire given device, while each child element represents a specific function of the device. In this example, the <DeviceTicket> defines printing and scanning functions under a first schema ("schema1"), while also defining an arbitrary example function <FunctionNTicket> under a different schema ("schemaN"). In this manner different <FunctionTicket> elements may be defined in different schemas for processing as defined by the namespace of the <DeviceTicket> element.

Turning to the contents of the ticket package 208, this element may specify different parameters relating to the work flow that the user wishes to perform. For example, the ticket package 208 may include any number of settings that are specific to particular devices, such as the devices 106. FIG. 2 shows a non-limiting example that includes a scan settings field 210 and a print settings field 212. In general, these device-specific settings may be defined based on the device capabilities 126. For example, an MFD 106N may advertise, through the device capabilities 126, a variety of different functions, while supporting different parameters applicable to these different functions. The user 104 may review these different functions and applicable parameters, and specify any particular functions and/or parameters that are of interest, through the ticket package 208.

The ticket package 208 may also include a routing instructions field 214 that specifies the components and/or processes 204 to which the given workflow is to be routed. For example, if a given document is to be scanned in to initiate a workflow, then the user 104 may specify that the document is to be reviewed and approved by a human or automated compliance entity at some point in the workflow. The routing instructions field 214 may specify who is to review and approve the workflow or the document.

The ticket package 208 may also include an archiving instructions field 216 that specifies whether one or more documents involved in a workflow are to be archived. If the document is to be archived, then the archiving instructions may specify when or how often to archive the document, as well as how to archive the document.

The ticket package 208 may also include a sanitization instructions field 218 that specifies whether one or more documents involved in a workflow are to be released outside of a given organization. If the documents may be released externally, then the sanitization instructions field 218 may further specify any portions of the documents that are to be removed, obscured, or otherwise sanitized before the documents are released. For example, any confidential or sensitive information may be removed before externally releasing the document. In some instances, the sanitization instructions field 218 may specify that certain documents are for internal use only, and not for external release.

Once the application 118 formulates the ticket package 208 for a given job, the application may route the job to the appropriate workflow process 204. The job is denoted generally at 220. The job 220 may be associated with a document container structure 222. The document container structure 222 may include the ticket package applicable to the given job, referenced for convenience at 208x. The document container structure may also include a content field 224 that contains content related to the given job 220. For example, if the job 220 relates to scanning a document, then the content field 224 may contain image data representing the scanned document. If the job 220 relates to printing a document, then the content field 224 may contain printable data representing the printable document.

To perform the job 220, the workflow process 204 may communicate with the devices 106 through the appropriate device driver 128. FIG. 2 represents these communications generally at 226.

Figure 3:
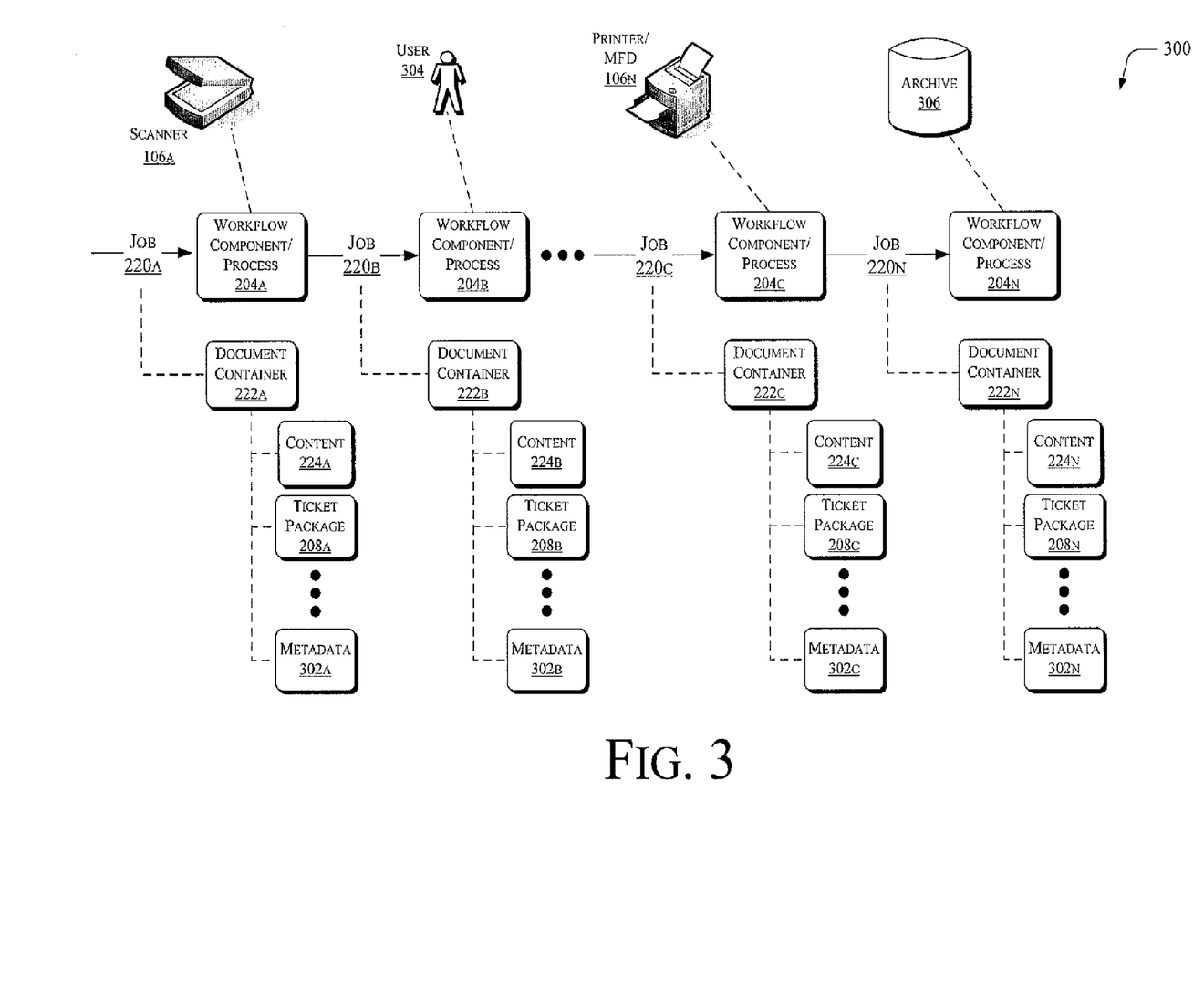
FIG. 3 is a combined block and flow diagram illustrating additional aspects of the document containers.

Having described the workflow processes and related ticket packages and document containers in FIG. 2, the discussion now proceeds to a description of additional aspects of the document containers as they may relate to multiple workflow processes, now presented in FIG. 3.

FIG. 3 illustrates combined blocks and flows 300 relating to additional aspects of the workflow processes and related ticket packages and document containers. For convenience of description, but not to limit possible implementations, some items described previously are carried forward into FIG. 3 and denoted by similar reference signs.

A given workflow may include a sequence of workflow components and/or processes 204. FIG. 3 shows four examples of these workflow components and/or processes are denoted at 204a, 204b, 204c, and 204n, but a given workflow may include any number of components and/or processes arranged in any sequential or parallel manner.

An incoming job 220a may be routed to the workflow component 204a for processing. The job 220a may be associated with a document container 222a, which may store any job-related content in the content field 224*a*. The document container 222*a* may store a ticket package relating to the job in the field 208*a*, and any metadata generated during the course of the workflow may be stored in a metadata field 302*a*. For example, the metadata may provide a history of a given workflow. In some instances, the metadata may indicate which workflow components 204 handled the workflow, and when they handled the workflow. Generally, the metadata may store any arbitrary information about the job or the content in the job, including the workflow history described above. Other examples of metadata may include job-related statistics, such as: the number of documents in the job; the number of pages in a given document; the times at which documents are printed or scanned; the times that virus checks have been run; general document information, such the author of the document, the times that the document was created, modified, accessed, or the like.

In an example shown in FIG. 3, the workflow component 204*a* may be a scan process, in which the scanner 106*a* scans a hardcopy of a document into electronic form for later processing. Once the workflow component 204*a* has scanned the document as the job 220*a*, the workflow component 204*a* may route a job 220*b* to a next workflow component 204*b*. As described above, the ticket package 208*a* may contain routing instructions (e.g., 214 in FIG. 2) that identify the next component 204*b* to participate in the workflow.

The job 220*b* may include an updated version of the document container structure, denoted at 222*b*. The updated document container 222*b* may include an updated content field 224*b*, which may contain, for example, the scanned document. The document container 222*b* may contain a ticket package 208*b*, which may be carried forward from the ticket package 208*a* or may be updated as part of the processes 204*a*. Finally, the document container 222*b* may contain a metadata field 302*b*, which may provide details on the processing performed by the process 204*a* or the process 204*b*.

Continuing the above example in which a workflow includes scanning a document, the job 220*b* may include, for example, a process 204*b* in which a human user 304 reviews, edits, approves, or performs any other action on the data in the content field 224*b*. Once this process is completed, a job 220*c* may be routed to a next component or process 204*c*. An updated instance of the document container for the process 204*c* is shown at 222*c*. In turn, the document container 222*c* may include, for example, content fields 224*c*, ticket package fields 208*c*, and metadata fields 302*c*.

In the example shown in FIG. 3, the process 204*c* may be an output process, such as printing the contents of the content field 224*c* on a printer or MFD 106*n*. This output process may be performed according to the settings specified in the ticket package 208*c*. Any metadata emitted during this output process may be captured in the metadata field 302*c*. Examples of this metadata 302*c* may include, but are not limited to, the name of a printer on which the content was printed, a time at which the content was printed, a status or result of a print job (e.g., success, failure, etc.), or the like.

FIG. 3 also illustrates a workflow process 204*n*, which is associated with an updated version of the document container 222*n*, with related fields 224*n*, 208*n*, and 302*n*. The workflow process 204*n* may be, for example, an archiving process in which document content is stored in an archive 306.

Having described the above workflow in FIG. 3, several observations are now noted. The document container 222 for a given workflow may be updated as the workflow progresses. Additionally, the ticket packages 208*a*-208*n* represent the states of the ticket package as it passes from one workflow component 204 to another. However, the ticket package 208 is understood to provide a single, consolidated location where workflow-related settings and/or parameters may be specified. This consolidated ticket package 208 may be passed from one workflow component to another as the workflow proceeds.

When a workflow component receives a job and the related ticket package 208, the workflow component may examine the ticket package for any settings and parameters that are understood under the schemas defined for the ticket package and the workflow components. In some instances, the ticket package may support different schemas recognized by different workflow components. For example, a given ticket package may express scan settings under one schema, while expressing print settings under another schema. In such instances, workflow components may ignore any elements appearing in a given ticket package that are expressed under unrecognized schemas.

In other instances, a given ticket package may express settings or parameters using different versions of the same schema. For example, the scanner and the printer may recognize the same schema; however, the scanner may recognize a newer version of the schema than the printer. In these latter scenarios, the ticket packages support the notion of versioning the capabilities of devices (e.g., 106).

Figure 4:
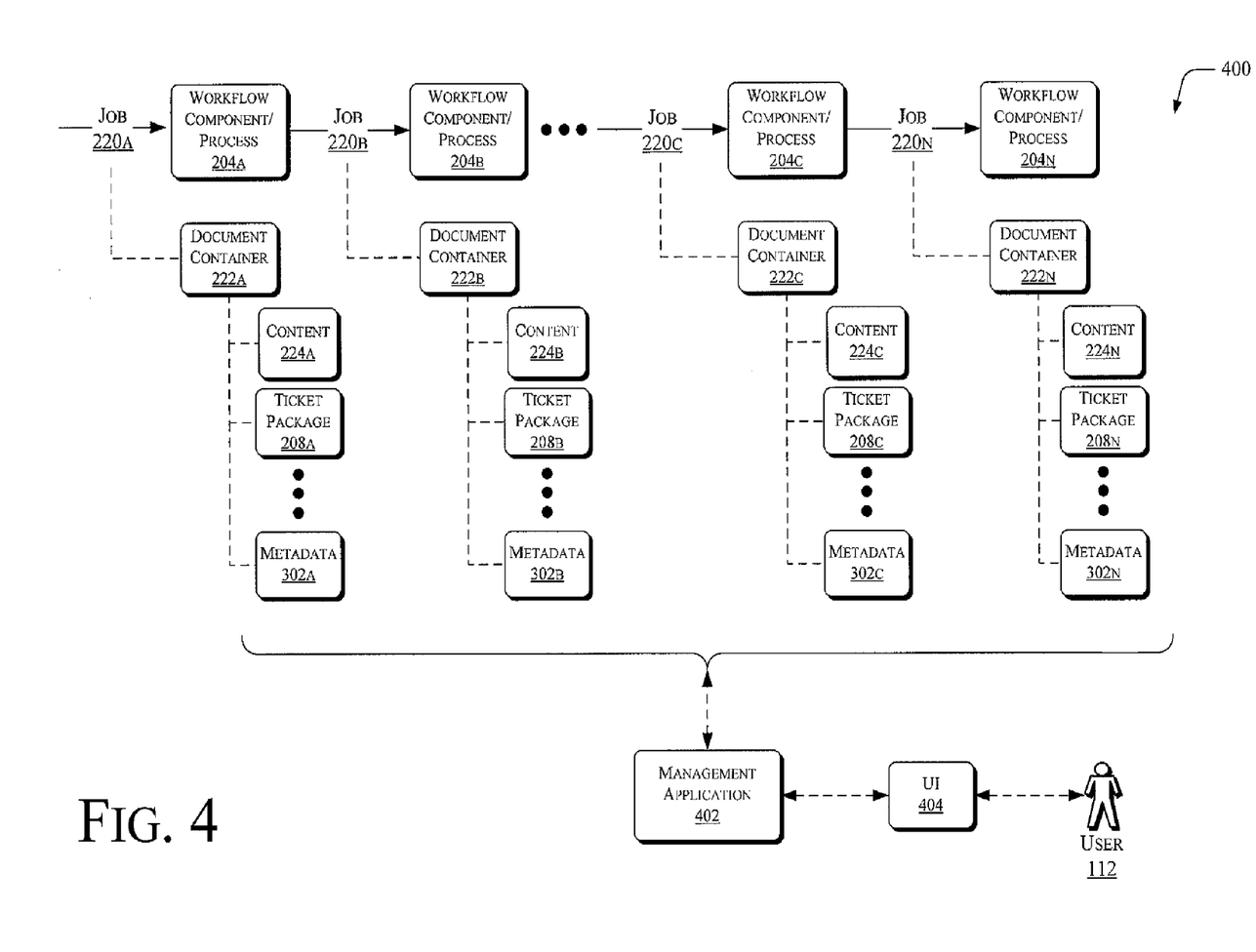
FIG. 4 is a combined block and flow diagram of a management application that may access the document containers.

Having described the above features in FIG. 3, the discussion now proceeds to a description of a management application that may access the document containers, now presented with FIG. 4. For convenience of description, but not to limit possible implementations, some items described previously are carried forward into FIG. 4 and denoted by similar reference signs.

FIG. 4 illustrates blocks and flows 400 related to enabling a management application 402 to access the document containers. A user 104 may interact with the management application 402 through a user interface (UI) 404. In this manner, the user 104 may perform tasks such as: querying for and obtaining device capabilities 126; specifying settings, preferences, or parameters that are loaded into ticket packages 206; or monitoring the status of jobs as they progress through various stages of a workflow.

The management application 402 may enable the latter function by presenting on the UI 404 a visual representation of the various jobs available for monitoring. More specifically, the management application may provide a preview or display status information for a printing job. The management application 402 may be responsive to user input to select a given job, and to access the document container 222 for the selected job. The management application may extract information from the document container, and populate the UI with this information, enabling the user to readily visualize the current status of the job.

In some instances, the management application may enable the user to adjust routing instructions associated with a particular job. In other instances, the management application may enable the user to add or delete components or processes 204 to a particular job. However, these examples are provided only to facilitate description, but not to limit possible implementations of the description herein.

In general, portions of the management application 402 may execute on any device participating in a given workflow. For example, the application 118 and the device driver 128, as shown in FIG. 1, may implement portions of the management application 402. Additionally, portions of the management application 402 may execute on a central server that is provided to monitor different workflows.

Figure 5:
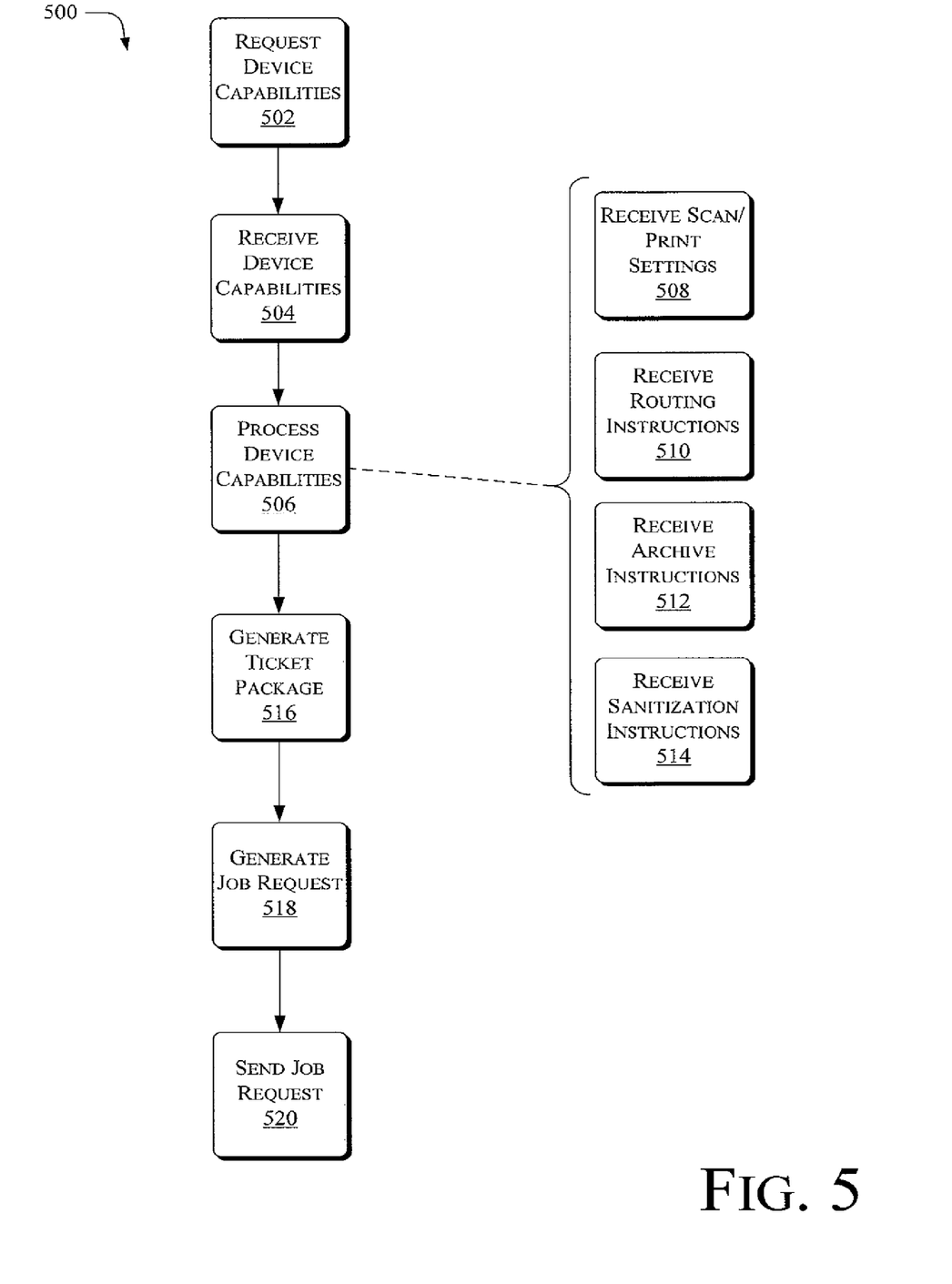
FIG. 5 is a flow diagram of processes for obtaining device capabilities and for submitting jobs into workflows.

Having described the management application in FIG. 4, the discussion now turns to a description of processes for obtaining device capabilities and for submitting jobs into workflows, now presented with FIG. 5.

FIG. 5 illustrates processes 500 for obtaining device capabilities and for submitting jobs into workflows. In possible implementations, aspects of the processes 500 may be performed by the device capabilities request component 120, the application 118, and/or the devices 102 shown in FIG. 1. However, it is noted that other devices and components may perform at feast portions of the processes 500 without departing from the scope and spirit of the description herein.

Block 502 represents requesting capabilities for one or more devices. FIG. 1 shows examples of the devices at 106, and shows examples of a query 122 that may request device capabilities 126. Block 502 may include repeating these requests for a plurality of different devices.

Block 504 represents receiving one or more indications of the capabilities of different devices. FIG. 1 shows an example of such device capabilities at 126.

Block 506 represents processing the device capabilities, and creating settings and routing instructions based on the device capabilities. Block 506 may include creating the settings and instructions based on user input, or based on prevailing business rules or logic.

As represented in blocks 508-514, generating the ticket package may include receiving indications of a variety of different parameters. For example, block 508 represents receiving device settings, e.g., print or scan settings. Block 510 represents receiving routing instructions that specify which components and/or processes are to participate in a given workflow. Block 512 represents receiving instructions relating to archiving functions performed with the given workflow. Block 514 represents receiving instructions relating to performing any sanitization operations within the given workflow.

Block 516 represents generating a ticket package based on the device capabilities may include generating the ticket package in connection with a job. FIGS. 2-4 show examples of jobs at 220, and also show progressions of jobs through different workflow components. As shown in FIG. 2, the job request may include the ticket package (e.g., 208).

Block 516 may include gathering the various setting parameters into a single, consolidated device ticket package. In this manner, the consolidated ticket package may accompany a given document as it passes through a given workflow, rather than having a variety of different ticket packages associated with different stages of the workflow.

Block 518 represents generating a job request to initiate or continue a given workflow. FIG. 1 shows an example of a job request at 130.

Block 520 represents sending the job request to one or more workflow components and/or processes. FIG. 3 illustrates a sequence of job requests 202a-202n through a variety of different workflow components and/or processes.

Figure 6:
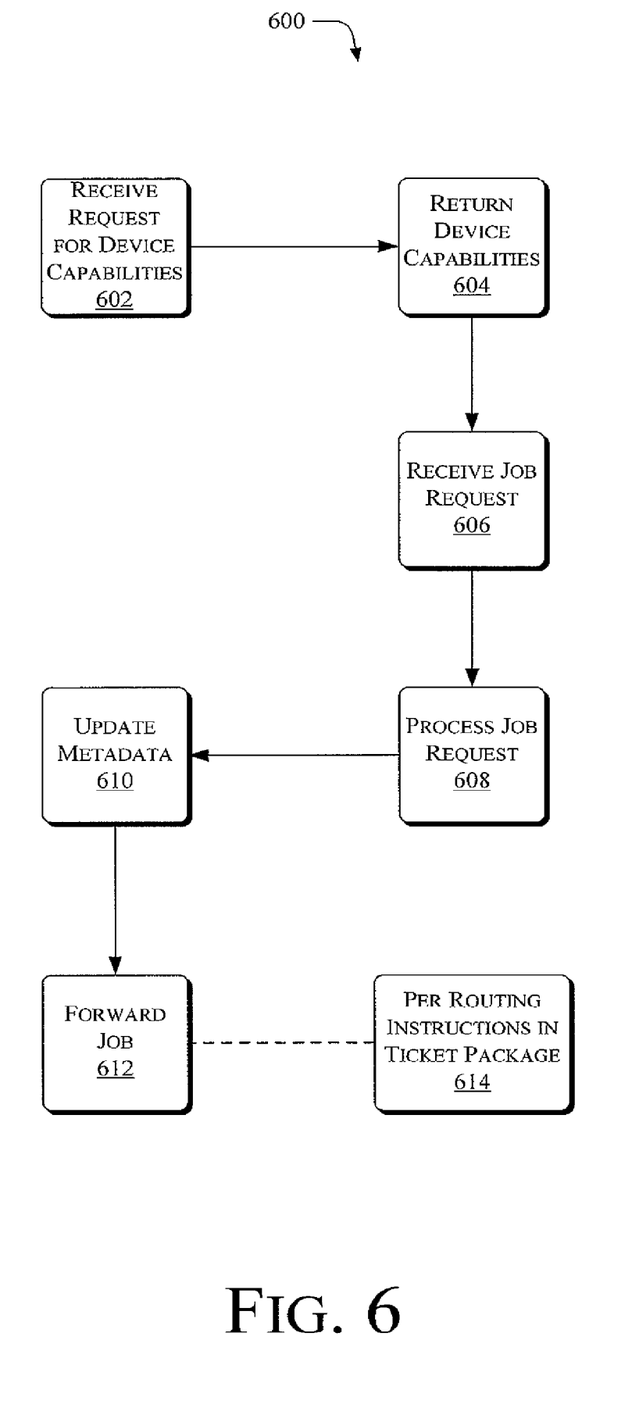
FIG. 6 is a flow diagram of processes for providing device capabilities and for processing job requests.

Having described processes for obtaining device capabilities and for submitting jobs into workflows in FIG. 5, the discussion now turns to a description of providing device capabilities and for processing job requests, now presented with FIG. 6.

FIG. 6 illustrates processes 600 for providing device capabilities and for processing job requests. In possible implementations, aspects of the processes 600 may be performed by the device capabilities response component 124, the device driver 128, and/or the devices 106 shown in FIG. 1. However, it is noted that other devices and components may perform at least portions of the processes 600 without departing from the scope and spirit of the description herein.

Block 602 represents receiving requests for device capabilities. FIG. 1 shows a query for such device capabilities at 122, and shows device capabilities 126.

Block 604 represents returning device capabilities, in response to the request received in block 602. Block 604 may include returning the device capabilities to software components executing on a client device, such as the devices 102 shown in FIG. 1.

Block 606 represents receiving a job request, which may incorporate one or more of the device capabilities reported in block 604 in the form of a ticket package. FIGS. 1 and 2 show examples of the job requests at 130. Block 606 may include receiving job requests that incorporate ticket packages (e.g., 206).

Block 608 represents processing the job request received in block 606, and performing whatever function is specified therein. Block 608 may include referring to the ticket packages in the job request, and performing functions in accordance to settings or specifications included in the ticket packages.

Block 610 represents updating any metadata included in the document container. FIG. 3 shows examples of metadata at 302.

Block 612 represents forwarding a job request to a next component in an ongoing workflow. Block 612 may include referring to the ticket packages for any routing instructions (e.g., 212 in FIG. 2) applicable to the ongoing workflow, and forwarding the job according to these routing instructions, as represented generally in block 614.

Figure 7:
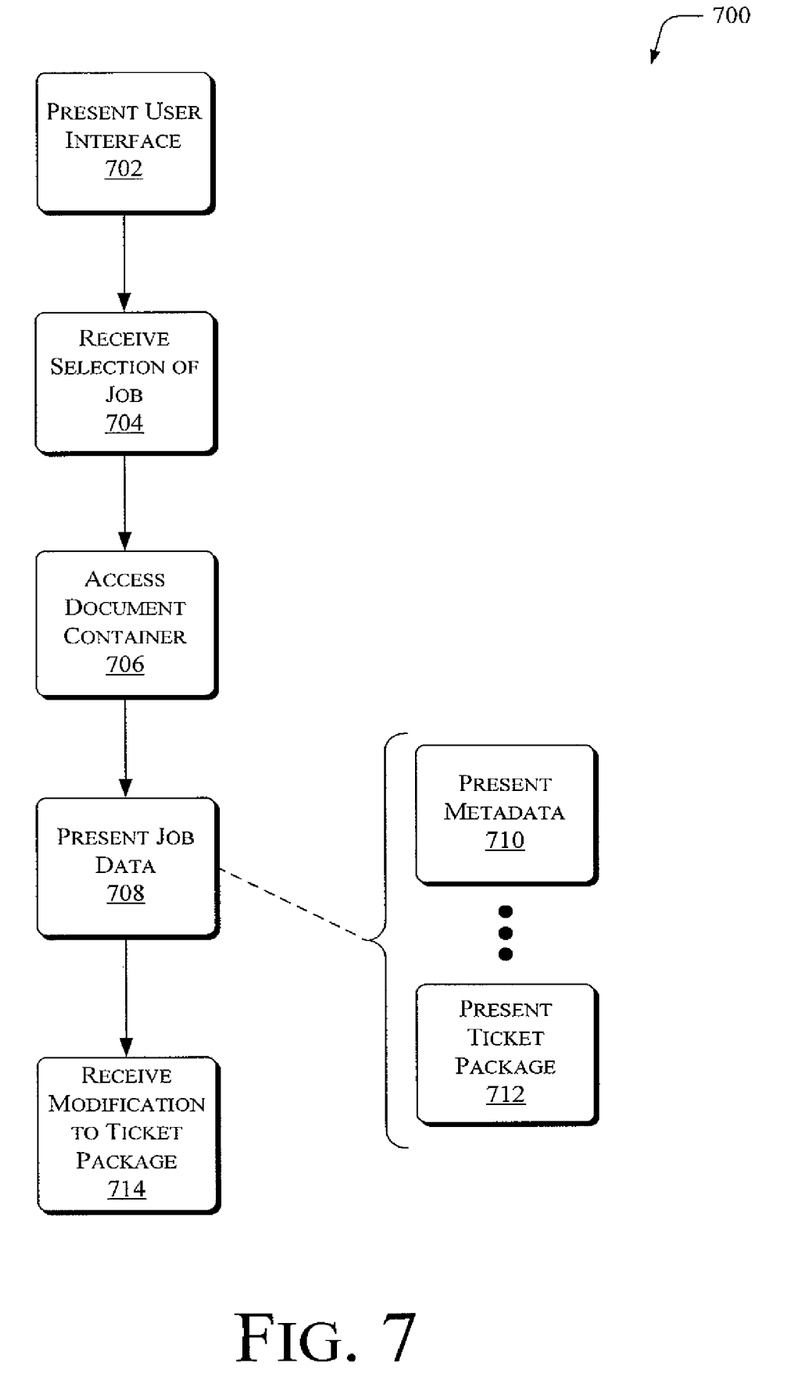
FIG. 7 is a flow diagram of processes for accessing information related to given jobs passing through the workflows.

Having described the processes for providing device capabilities and for processing job requests in FIG. 6, the discussion now turns to a description of processes for accessing information related to given jobs passing through workflows, now presented with FIG. 7.

FIG. 7 illustrates processes 700 for accessing information related to given jobs passing through the workflows. In possible implementations, aspects of the processes 700 may be performed by the management application 402 shown in FIG. 4, and/or the devices 102 and 106 shown in FIG. 1. However, it is noted that other devices and components may perform at least portions of the processes 700 without departing from the scope and spirit of the description herein.

Block 702 represents presenting a user interface (UI) to a user. FIG. 4 shows an example UI at 404, and an example user at 104. Block 702 may include presenting information related to one or more jobs or workflows to the user.

Block 704 represents receiving a selection of one of the jobs or workflows from the user. Block 704 may include receiving the selection in response to the information presented in block 702, and may include receiving indications of mouse-clicks or other actions performed by the user to interact with the UI.

Block 706 represents accessing a document container related to a selected job or workflow. FIG. 2 shows an example document container at 218. Block 706 may include accessing the document container for the selected job or workflow to provide current status, or to enable the user to adjust one or more settings related to the selected job or workflow.

Block 708 represents presenting the user with information related to the selected job or workflow. Block 708 may include accessing metadata or content stored in the document container, and presenting that metadata or content for review by the user, as represented by block 710. Block 708 may also include presenting information from the ticket packages to the user, as represented by block 712.

Block 714 represents receiving modifications to the ticket packages from the user. For example, having reviewed the contents of the ticket packages presented in block 712, the user may alter the ticket packages for subsequent processing. These alterations may reflect modified preferences, policy changes, updated best practices, or the like.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A computer-readable storage medium comprising computer-readable instructions that, when executed by a computing device, cause the computing device to perform a method comprising:
    requesting indications of capabilities of one or more devices that participate in a workflow using separate application programming interfaces (APIs);
    receiving the indications of the capabilities of the one or more devices specified in a plurality of schemas, wherein the plurality of schemas specify at least some device capabilities of at least one device that are different from each other using separate schemas; and
    generating a ticket package that is based on the device capabilities of the device, wherein the ticket package is consolidated across the workflow, and the ticket package supports versioning the capabilities of the one or more devices using separate versions of a same schema for separate devices of the one or more devices.

2. The computer-readable storage medium of claim 1, wherein the instructions for generating a ticket package include instructions for receiving device settings for the one or more devices.

3. The computer-readable storage medium of claim 2, wherein the instructions for receiving device settings include instructions for receiving scan or print settings.

4. The computer-readable storage medium of claim 1, wherein the instructions for generating a package include instructions for receiving routing instructions related to the workflow.

5. The computer-readable storage medium of claim 1, wherein the instructions for generating a ticket package include instructions for receiving archiving instructions related to the workflow.

6. The computer-readable storage medium of claim 1, wherein the instructions for generating a ticket package include instructions for receiving sanitization instructions related to the workflow, the sanitization instructions specifying whether a document that is involved in the workflow is to be released externally relative to an organization, and further specifying which portion of the document is to be removed or obscured in an event that the document is to be released externally relative to the organization.

7. The computer-readable storage medium of claim 1, further comprising instructions for generating a job, and for sending the job to at least one component involved in the workflow.

8. A computer-readable storage medium comprising computer-readable instructions that, when executed by a computing device, cause the computing device to perform a method comprising:
    receiving, by a workflow component of a workflow, a job that includes a ticket package, wherein the ticket package is consolidated across the workflow, and wherein the ticket package supports different schemas that are recognized by different workflow components of the workflow; and
    examining, by the workflow component, the ticket package for any setting or parameter that is understood under a schema defined for the workflow component, wherein the examining further comprises ignoring any setting or parameter in the ticket package that is expressed under a schema unrecognized by the workflow component.

9. The computer-readable storage medium of claim 8, further comprising instructions for processing the job.

10. The computer-readable storage medium of claim 8, further comprising instructions for processing the job based on the ticket package.

11. The computer-readable storage medium of claim 8, further comprising instructions for receiving a document container associated with the job.

12. The computer-readable storage medium of claim 11, wherein the document container includes at least the ticket package.

13. The computer-readable storage medium of claim 8, further comprising instructions for updating the ticket package.

14. The computer-readable storage medium of claim 8, further comprising instructions for forwarding the job based on routing instructions included in the ticket package.

15. A computer-readable storage medium comprising computer-readable instructions that, when executed by a computing device, cause the computing device to perform a method comprising:
    presenting a user interface to a user, wherein the user interface includes representations of a workflow;
    receiving from the user a selection of the workflow;
    presenting information from a ticket package related to the workflow, wherein the ticket package is consolidated across the workflow, and wherein the ticket package supports versioning capabilities of multiple workflow components using separate versions of a same schema for separate workflow components of the multiple workflow components.

16. The computer-readable storage medium of claim 15, further comprising instructions for accessing a document container related to the workflow, wherein the document container contains at least the ticket package.

17. The computer-readable storage medium of claim 15, further comprising instructions for presenting a ticket package related to the job that is selected by the user.

18. The computer-readable storage medium of claim 15, further comprising instructions for presenting another ticket package from the workflow that is selected by the user.

19. The computer-readable storage medium of claim 15, further comprising instructions for presenting information representing the ticket package to the user.

20. The computer-readable storage medium of claim 15, further comprising instructions for receiving from the user indications of at least one modification to the ticket package.

* * * * *